United States Patent
Pang

(10) Patent No.: US 6,600,523 B2
(45) Date of Patent: Jul. 29, 2003

(54) STRUCTURE OF STORAGE CAPACITOR ON COMMON OF TFT-LCD PANEL AND FABRICATION METHOD THEREOF

(75) Inventor: Jia-Pang Pang, Taichung Hsien (TW)

(73) Assignee: Unipac Optoelectronics Corp., Hsinchu (TW)

( * ) Notice: Subject to any disclaimer, the term of this patent is extended or adjusted under 35 U.S.C. 154(b) by 159 days.

(21) Appl. No.: 09/781,771

(22) Filed: Feb. 12, 2001

(65) Prior Publication Data

US 2002/0071063 A1 Jun. 13, 2002

(30) Foreign Application Priority Data

Dec. 11, 2000 (TW) .......................... 89126332 A

(51) Int. Cl.[7] ...................... G02F 1/1343; G02F 1/1333
(52) U.S. Cl. .............................. 349/38; 349/39; 349/54; 349/55; 250/370
(58) Field of Search .............................. 349/38, 39, 54, 349/55; 250/370

(56) References Cited

U.S. PATENT DOCUMENTS 5,173,792 A * 12/1992 Matsueda ..................... 349/54
5,260,818 A * 11/1993 Wu .............................. 349/55
5,691,786 A * 11/1997 Nakai ........................... 349/39
6,411,346 B1 * 6/2002 Numano et al. ............... 349/39
6,437,341 B1 * 8/2002 Izumi et al. ................. 250/370

* cited by examiner

Primary Examiner—Julie Ngo
(74) Attorney, Agent, or Firm—J.C. Patents

(57) ABSTRACT

A structure of a storage capacitor on common (Cst on common) that is connected to a capacitor switch element. The Cst on common has a first capacitor electrode, a capacitor dielectric layer, a second capacitor electrode and a redundant pattern. The first capacitor electrode, that is, a common electrode line is connected to the capacitor switch element. The capacitor dielectric layer is located on the common electrode line. The second capacitor electrode is formed on the capacitor dielectric layer. Therefore, a capacitor is built with the first and the second capacitor electrode and the capacitor dielectric layer. The redundant pattern has two ends, both connected on the common electrode line. When the defective capacitor is cut and separated, the redundant pattern maintain the continuity of the common electrode line.

10 Claims, 1 Drawing Sheet

STRUCTURE OF STORAGE CAPACITOR ON COMMON OF TFT-LCD PANEL AND FABRICATION METHOD THEREOF

CROSS-REFERENCE TO RELATED APPLICATION

This application claims the priority benefit of Taiwan application serial no. 89126332, filed Dec. 11, 2000.

BACKGROUND OF THE INVENTION

1. Field of Invention

The present invention relates to a display device. More particularly, the present invention relates to a structure of a storage capacitor on common (Cst on Common.)

2. Description of Related Art

A display is a commonly-used device, especially the use of a display required in a television or a computer. Normally, a cathode ray tube is used in design for the display, but it requires a large area. A notebook computer particularly cannot use the display with cathode ray tube design. Therefore, a planar display of a pixel-matrix product, such as a liquid crystal display (LCD) or a thin film transistor liquid crystal display (TFT-LCD,) has been successfully introduced in the market. Image of the TFT-LCD is composed by the pixel matrix. Each pixel is controlled by a thin film transistor.

As a larger display area of TFT-LCD is desired, it is a trend to design the pixel with the type of Cst on Common for reducing the affection of the gate delay on driving the TFT-LCD. In this design manner, the common electrode and the gate electrode are separately formed. When a fabrication residual matter remains near the capacitor the residual matter may cause a short circuit and causes a defect of bright spot on the pixel. In this situation, a laser is usually used to remove the residual matter when the residual matter remains, and this may also open the common electrode line, causing a gate undertone line. In order to avoid the undertone line, the current method tends not to repair the defect of the bright spots when it occurs on the capacitor. This causes the existence of the bright spots in the display device.

However, the current market requires that a display have the best image quality. The main trend for fabricating the LCD is thus forming a non-bright spot by using the technique of laser repair and changing the bright spot to a dark spot. The current technique of laser repair cannot make a fully dark spot, because the latest technique of forming the dark spot will also cause a defect of the light line due to a short circuit between the common electrode and the gate electrode. Therefore, an important key to improving image quality is solving the defect points of the storage capacitor.

SUMMARY OF THE INVENTION

The invention provides a structure of a capacitor. The structure allows a dark spot process to be performed without causing an undertone line.

As embodied and broadly described herein, the invention provides a structure of a capacitor that is connected to a capacitor switch element. The structure of the storage capacitor on common includes a first capacitor electrode, a capacitor dielectric layer, a second capacitor electrode and a redundant pattern. The first capacitor electrode is a common electrode line connected to the capacitor switch element. The capacitor dielectric layer is located on the common electrode line. The second capacitor electrode is located on the capacitor dielectric layer. Therefore, a capacitor is formed by the first capacitor electrode and the second capacitor electrode and the capacitor dielectric layer. The redundant pattern has two ends and both two ends are connected to the common electrode line. The common electrode line can maintain the conducting state without open circuit due to the redundant pattern when the defective capacitor is cut and separated.

When the dark spot process is performed, the capacitor having defect can be cut and separated. Since the redundant pattern is connected to both ends of the capacitor that is cut and separated, the conducting state of the whole common electrode line remains. As a result, an open common electrode line is prevented from occurring, and therefore the gate undertone line is avoided. The image quality is improved.

In the above, the capacitor switch element includes a thin film transistor that is used on a liquid crystal display.

The design of the redundant pattern of this invention can easily achieve the objective of a non-bright spot; therefore the image quality is further improved.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

One of the major characteristics of this invention is the redundant pattern that allow a dark spot process to be performed without causing the gate undertone line on the whole structure.

Figure 1A:
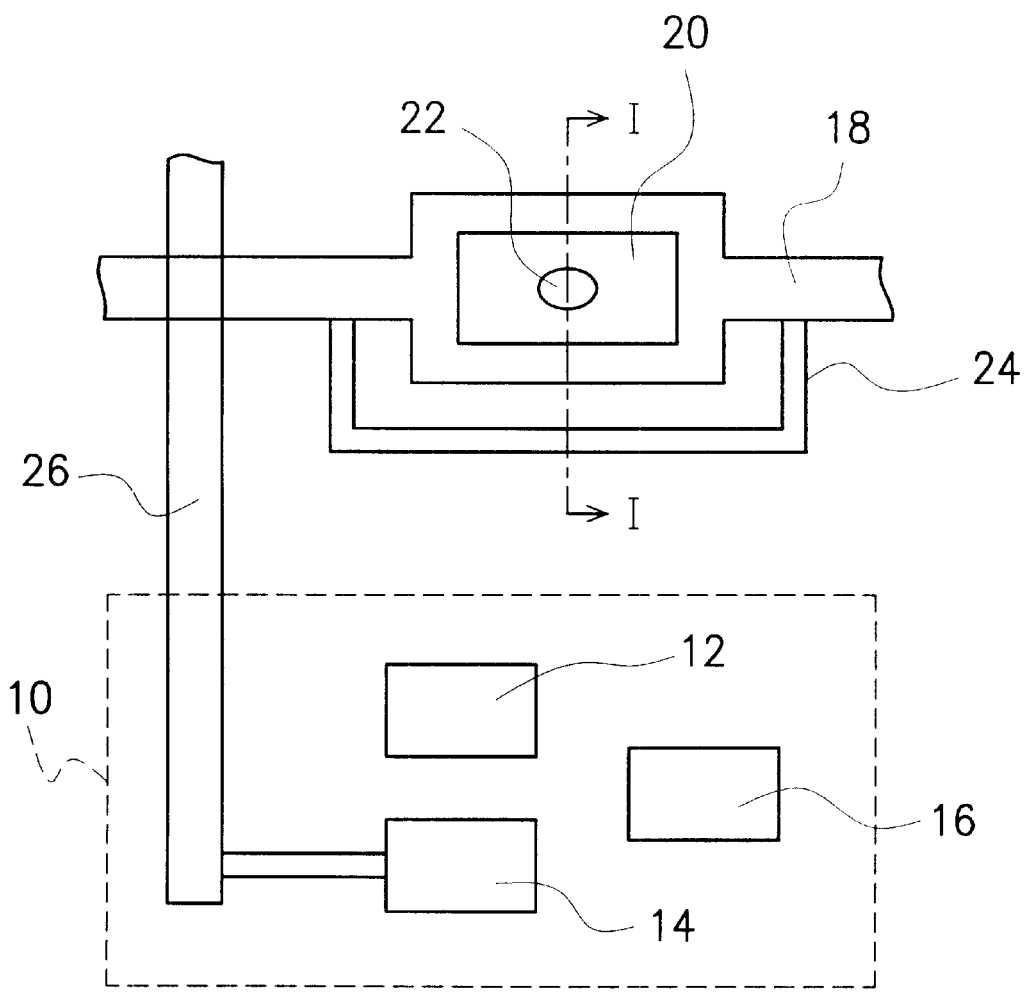
FIG. 1A is a top view of a storage capacitor on common and a capacitor switch element according to one preferred embodiment of this invention.
Figure 1B:
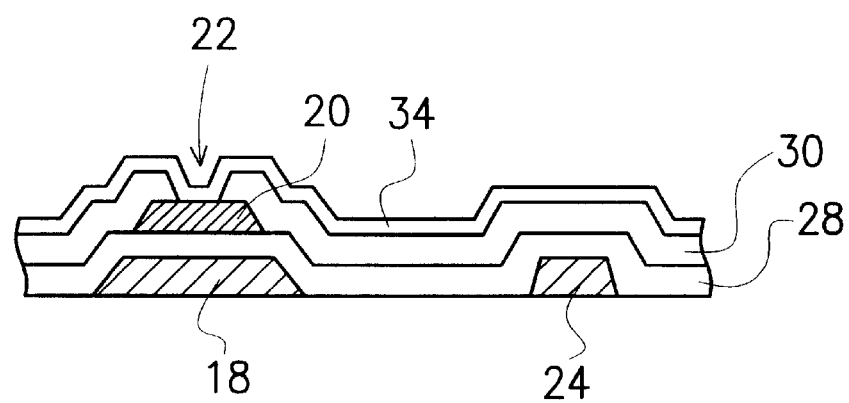
FIG. 1B is a cross-sectional view along the line I—I in FIG. 1A according to one preferred embodiment of this invention.

FIG. 1A illustrates a top view of a storage capacitor on common (Cst on Common) and a capacitor switch element according to one preferred embodiment of this invention. FIG. 1B illustrates a cross-sectional view along the line I—I in FIG. 1A. Referring to FIG. 1A and FIG. 1B, a structure of a Cst on Common includes a common electrode 18 that is formed on a substrate. A capacitor dielectric layer 28 is formed on the common electrode 18, as shown in FIG. 1B. Another capacitor electrode 20 is formed on the capacitor dielectric layer 28. Thus, a capacitor is constructed.

A redundant pattern 24 is particularly introduced in this invention. Two ends of the redundant pattern 24 are connected to the common electrode 18, for example, a parallel manner. When the capacitor is cut by, for example, the laser, the common electrode 18 can remain continuation and cross over the defective capacitor through the redundant pattern 24. The whole common electrode 18 remains conduction without be open due to the cut on the defective capacitor.

This storage capacitor on common usually can be connected to a capacitor switch element 10. More particularly, in a TFT-LCD, the thin film transistor serves as a capacitor switch element 10. A data line 26 connects the capacitor switch element 10 and the storage capacitor on common. The thin film transistor (TFT) of the capacitor switch element 10 includes a source 12, a drain 14 and a gate 16. The structure of the TFT of the capacitor switch element is well-known in the art, it is not further described in detail here.

Referring to FIG. 1B, after the capacitor on common is formed, some interconnecting structures are subsequently formed. For example, a protection layer 30 is formed over to protect the device. An opening 22 is formed in the protection layer 30 to exposes the electrode 20. A transparent electrode layer 34 is formed on the protection layer 30 and is connected to the electrode 20 of the capacitor on common through the opening 22.

The redundant pattern 24 of this invention usually can be used in design of the capacitor on common, and is helpful for repairing the capacitor that has defect without affecting the continuity of the common electrode 18 and avoids an open circuit. More particularly to application in the thin film transistor liquid crystal display (TFT-LCD), the image quality is effectively improved.

The shape, structure and material of the redundant pattern 24 can be different and specifically chosen according to actual design. The redundant pattern 24 is freely chosen to be connected to the capacitor and achieve at least the purpose to maintain the continuation the common electrode. The material of the redundant pattern includes a conductive material, and preferably includes metal. The redundant pattern can effectively improve the function of the dark spot process to darken the bright spots In the fabrication process of thin film transistor liquid crystal display, the invention is mainly related to the fabrication of the thin film transistor array. During the first photomask process, a redundant pattern near the capacitor is included. This redundant pattern does not cause coupling side effect with other metal layers. The width of the metal line of the redundant pattern is very small, and the aperture ratio is therefore not lost. Moreover, since the space between the redundant pattern and the gate electrode maintains a certain distance, the yield is not reduced either. If the capacitor has defects caused by foreign matter nearby during the fabrication process of the TFT array, the redundant pattern allows the laser to cut the defective capacitor in the panel-testing station after the fabrication process is done. (This problem may be caused by the adhesion of the foreign matter or other factor during the fabrication process.) As a result, it can be effectively avoided that the open circuit occurs on the common electrode line causing gate undertone line. Therefore, the redundant pattern can maintain the continuation of the whole common electrode line.

Due to the redundant pattern, a bright spot can be darkened to a dark spot by a usual dark spot process. Thus, the ratio of the non-bright spot is greatly increased, and the image quality is also greatly improved. In the invention, since the defective capacitor can be isolated at the panel-testing station after the fabrication of the TFT array, the device yield is greatly increased and it has less side effect of metal particles which are produced by the laser repairing process and distributed into the panel.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A structure of a storage capacitor on common that is connected to a capacitor switch element, the structure comprising:
   a common electrode line, serving as a first electrode connecting to the capacitor switch element;
   a dielectric layer located on the common electrode line;
   a second electrode, formed on the capacitor dielectric layer for forming a capacitor; and
   a redundant pattern with two ends connected to the common electrode line, wherein the capacitor is positioned in between said two ends of said redundant pattern to provide a route to allow the common electrode line to maintain electrical connectivity with the capacitor switch element when the capacitor is cut and separated.

2. The structure of claim 1, wherein the redundant pattern includes a line route.

3. The structure of claim 1, wherein the capacitor switch element comprises a thin film transistor (TFT) that is used in a liquid crystal display (LCD).

4. The structure of claim 1, further comprising a protection layer covering on the capacitor, wherein the protection layer has an opening to expose the second electrode.

5. The structure of claim 4, further comprising a transparent electrode layer formed on the protection layer, and coupled to the second electrode through the opening.

6. A method of avoiding open circuit on a common electrode line of a storage capacitor on common, comprising a common electrode line serving as a first electrode connecting to a capacitor switch element, a dielectric layer over the common electrode line, and a second electrode disposed over the capacitor dielectric layer forming a capacitor, wherein a capacitor switch element is connected to the capacitor, the method comprising:
   forming a redundant pattern having two ends connected to the common electrode line, wherein the capacitor is positioned in between said two ends of said redundant pattern such that when the capacitor is cut and separated, the redundant pattern provides a route to allow the common electrode line to maintain an electrical connectivity with the capacitor switch element.

7. The method of claim 6, wherein the capacitor switch element comprises a thin film transistor (TFT) that is used for a liquid crystal display (LCD).

8. The method of claim 6, wherein the redundant pattern includes a line route.

9. A method of forming a common capacitor, comprising the steps of:
   forming a capacitor switch element;
   forming a common electrode line electrically connecting with the capacitor switch element;
   forming a capacitor on the common electrode line between the two ends of the redundant pattern, wherein the capacitor is the common electrode line serves as an capacitor electrode; and
   forming a redundant pattern, wherein the redundant pattern has two ends respectively connected on the common electrode line such that when the capacitor is cut and separated, the redundant pattern provides a route to allow the common electrode line to maintain an electrical connectivity with the capacitor switch element.

10. The method of claim 9, wherein the capacitor switch element comprises a thin film transistor (TFT).

* * * * *